United States Patent Office 3,468,288
Patented Sept. 23, 1969

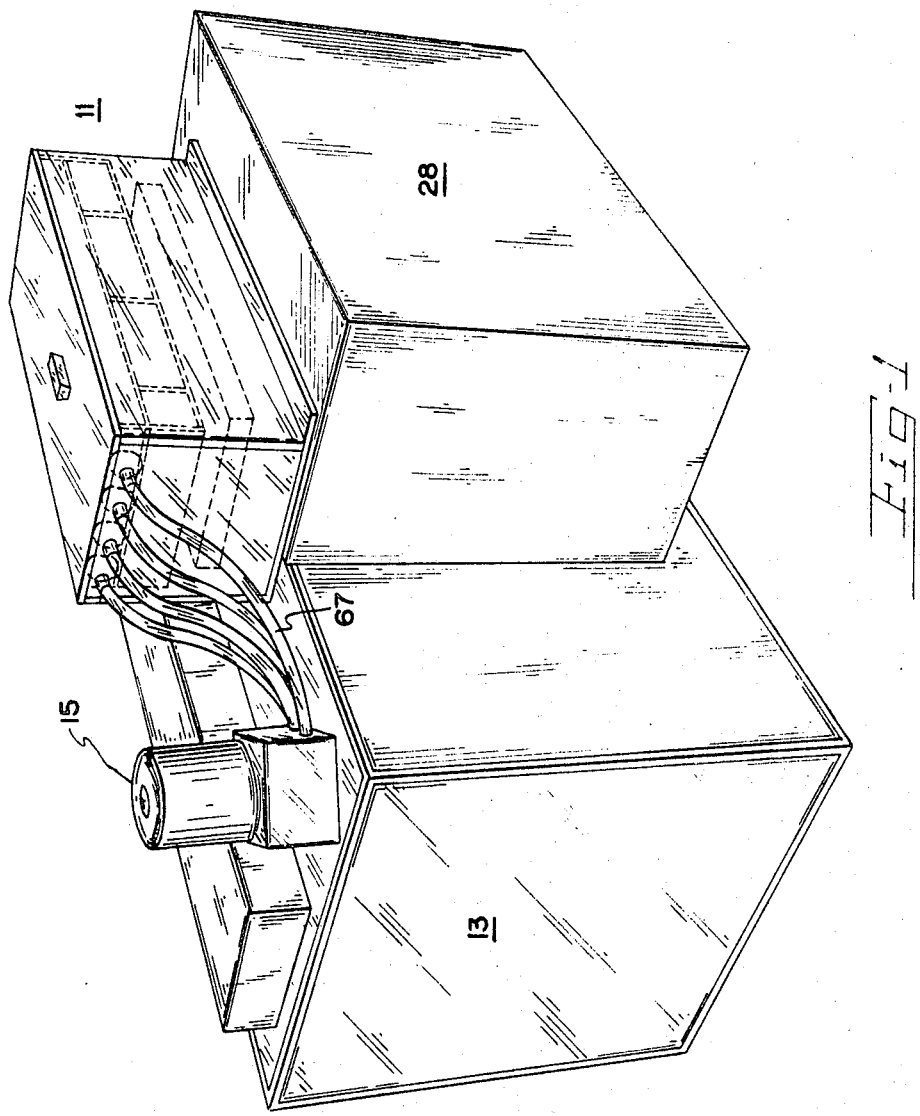

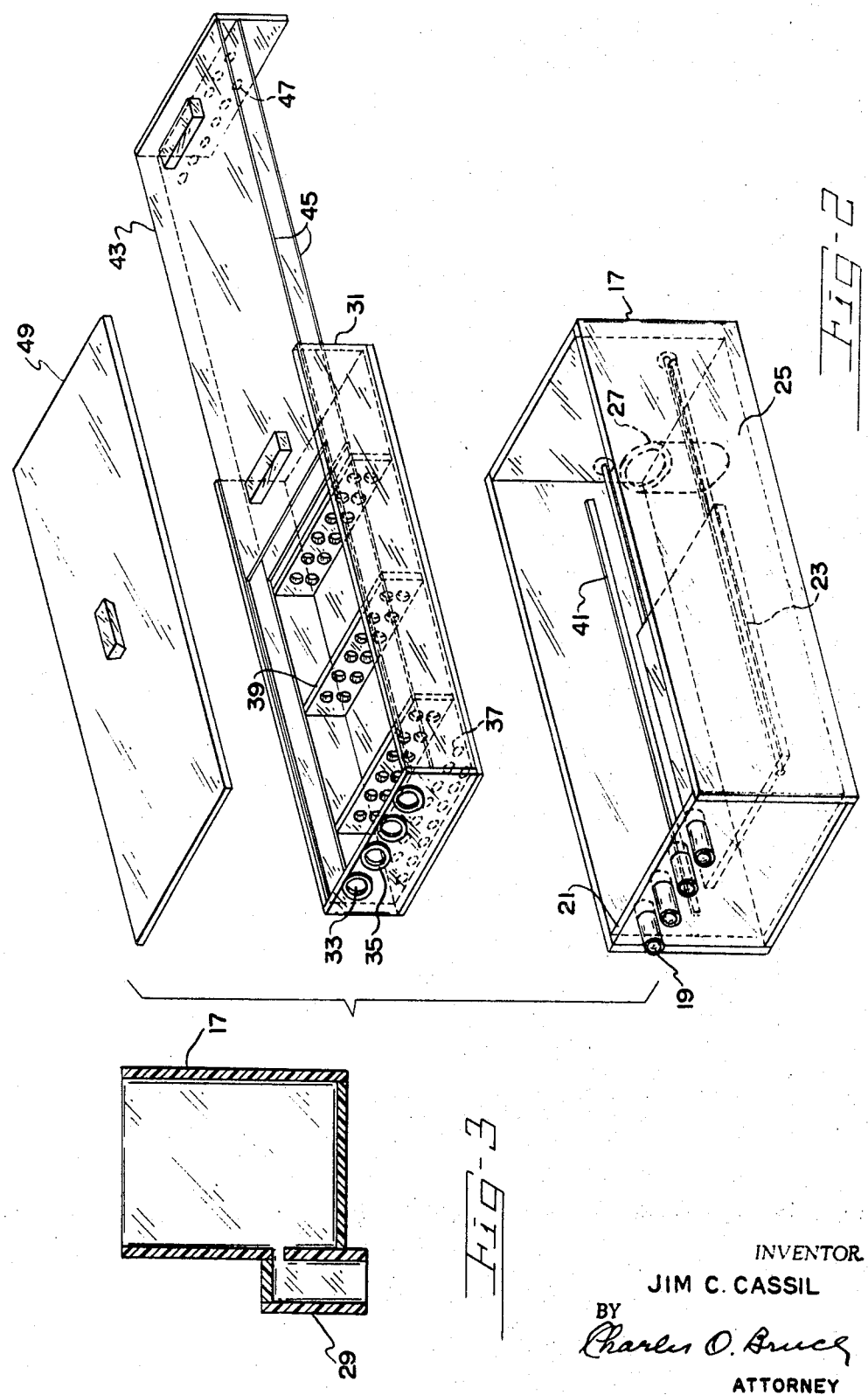

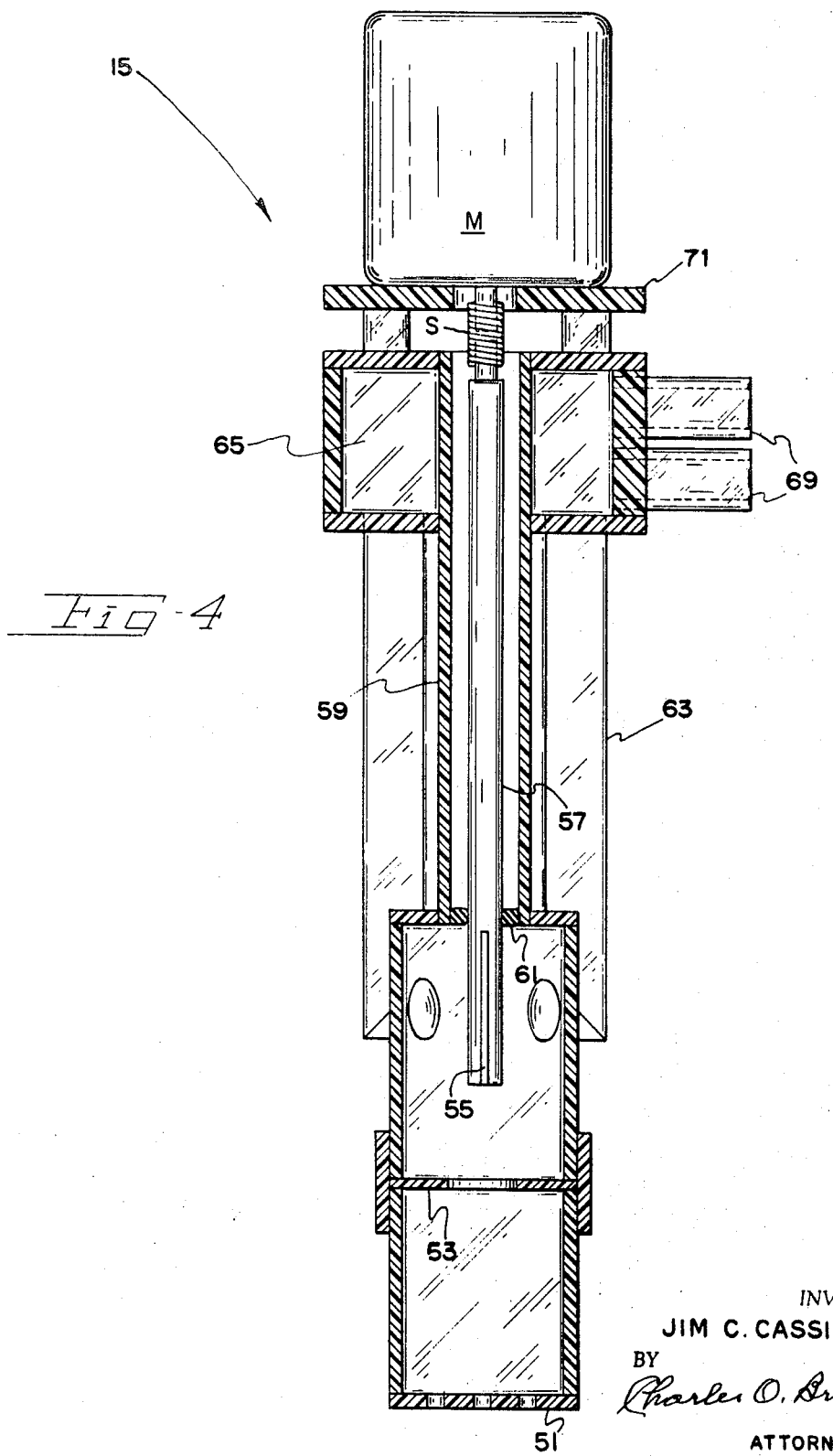

3,468,288
AQUARIUM CONDITIONER
Jim C. Cassil, 2027 Key Blvd.,
El Cerrito, Calif. 94530
Filed May 22, 1967, Ser. No. 640,115
Int. Cl. A01k *63/00, 64/00;* B01d *23/02*
U.S. Cl. 119—5                                18 Claims

ABSTRACT OF THE DISCLOSURE

A filter, aeration, heater-cooler unit for processing aquarium water through elonagted vertically stacked and nested chambers by inletting water to the top chamber and passing it downward in horizontal passes through a filter chamber and a heating-cooling chamber and spilling it back into the aquarium.

BACKGROUND OF THE INVENTION

Field of the invention

The present invention relates to aquarium conditioners and more particularly to an aquarium water conditioner for filtering, aerating, and heating or cooling the water.

For centuries people have been interested in the colorful and varied species of sea life and have made many attempts to raise and maintain them in the environments where they could both be studied and enjoyed. The major problem has been in constructing an artificial environment that would allow the species to live and reproduce as well as they do in their natural habitat. The surroundings have to be controlled as to temperature and condition of the water to produce the required environment. The present invention provides the necessary conditions.

DESCRIPTION OF THE PRIOR ART

There are many problems to providing an artificial environment for sea life. The water must be kept at a specified temperature by a dependable temperature control means. Putting either heating or cooling units inside the tank presents problems of contamination and breakdown. If a decorative rock or other object is leaned against a tube containing a refrigerant, the whole tank can become contaminated or damaged as a result of electrolysis of the refrigeration tubes or of the elements of the rock. If the refrigerating element, or any other mechanical object is placed on the side of the tank, it detracts from the aesthetic appearance thereof.

Conditioning units are required which can change the temperature of the water at a very rapid rate and accurately maintain the water at the desired temperature. Temperature fluctuation can be tolerated for short periods of time by sea life, but the quicker the correct climate is established and maintained, the greater are the chances of survival for the specimens.

Many devices have been utilized for the purpose of providing the necessary conditions for maintaining various species of sea life. However, in most instances, the previous devices have not been capable of circulating and cleaning large amounts of water, and have utilized parts suspended in the tank which were easily broken. Failure of any of the parts usually stopped the whole environment conditioning process and killed the valuable specimens.

Generally salt water fish eat more slowly than fresh water fish and it is therefore necessary that the food remain in the tank for longer periods of time and not be filtered out of the water. Thus, the pumping means must be capable of pumping large amounts of water without ingesting food and especially the small specimens.

The presently known prior art utilized to accomplish the objectives heretofore set forth comprise relatively large and expensive units. The closest prior art device which has been discovered is the U.S. Patent No. 597,249 to P. Smith for an aquarium. That device involves taking the water from the aquarium and forcing it into a conditioner at a lower level therein. It is forced upward through a heating element and a filter bed to a spillway for return to the aquarium. Other known types of aquarium conditioning apparatus include floor based arrangements which filter the water through the gravel bed at the bottom of the aquarium into a conditioning system located in the base below the tank. These units have acceptable performance but are very expensive.

The pumps presently utilized in salt water tanks for circulating the water are notoriously subject to corrosion which causes slowdown and even stoppage. This renders the whole conditioning apparatus inoperable. The pump impellers also usually become covered with salt crystals which substracts from the effieciency of the pumps for maintaining the volumetric flow of water. The slowdown of the pump gives the crystals an increased ability to build up on the pumping blades, and the blades also collect particles which would otherwise be removed by the filters. The diminished flow of water going through the filters eventually produces a dirty tank which seriously affects the ability of the specimens to survive.

SUMMARY OF THE INVENTION

The present invention is an aquarium conditioner which is considerably less expensive than the presently utilized means of providing aquarium environments. It comprises at least two elongated chambers having inlet means at one end of the first of the chambers and outlet means, at the other end of the first chamber from the inlet means, communicating with the second of said chambers, a spillway intake disposed at the other end of the second chamber from the outlet means of the first chamber for communicating with an aquarium, filter means disposed in one of the chambers and an automatic temperature control element disposed in the other of the chambers. A high volume flow pumping means is provided for semi-pressurizing the conditioner with the water to be treated.

The water to be reconditioned is pumped into the inlet means at the end of the first chamber and either filtered or its temperature changed, depending upon which type of conditioner is located in the first chamber, and the water is then passed through the outlet means into the second of the chambers where it undergoes the other conditioning process. The water then flows over the spillway intake which lets the cleansed and tempered water fall into the aquarium.

It is therefore an important object of the present invention to provide an aquarium conditioner which can be placed on top of the tank, thereby eliminating most of the conditioning apparatus from within the tank.

It is another object of the present invention to provide a semi-pressurized aquarium conditioner which is leak proof and guards against the danger of overflow.

It is a further object of the present invention to provide a contained unit aquarium conditioner which has elongated nested compartments vertically stacked for permitting the flow of water downward through the conditioner by horizontal passes.

It is still another object of the present invention to provide an aquarium conditioner which can either lower or raise the temperature of the aquarium water and maintain either a raised or lowered temperature with respect to the ambient air temperature.

It is still a further object of the present invention to provide an aquarium conditioner in which the filter package can be easily removed and the filter material cleaned.

It is yet another object of the present invention to provide an aquarium filter which circulates the water in the tank.

And yet a further object of the present invention is to provide a circulating pump for the aquarium conditioner which provides a high volumetric flow without corrosion or crystallization of the parts and restricts the ingestion of food or small specimens.

DESCRIPTION OF THE DRAWINGS

FIGURE 1 is a perspective view of the present invention disposed in operating position on an aquarium tank and showing a refrigeration unit disposed behind the tank;

FIGURE 2 is an exploded perspective view of the aquarium conditioner;

FIGURE 3 is an end sectional view of only the larger of the chambers showing an alternative spillway embodiment; and FIGURE 4 is a side elevation in section of the pump of the present invention.

DESCRIPTION OF THE PREFERRED EMBODIMENT

Reference is made to the drawings for understanding the present invention. There shown is an aquarium conditioner 11 which can be placed on top of an aquarium tank 13. The conditioner has two elongated chambers which perform the filtering and temperature adjustment function. These chambers could very easily be arranged side by side, or overlapping in step formation, or end to end, or even stood on end side by side. However, for purposes of compactness, they are arranged longitudinally adjacent, one above the other, and utilize gravity flow for helping the conditioner operate.

It is an important parameter that the water returned to the aquarium tank be circulated through the tank before it is picked up by the circulating pump 15 and redelivered to the conditioner. Thus, either the pickup of the pump or the inlet end of the conditioner should be disposed opposite from the discharge end of the conditioner. Water discharged from the conditioner at one end of the aquarium tank must then traverse the length of the tank before it is picked up by the pump for recycling. In a two-chamber conditioner, this could be done by placing either the circulating pump as a whole, or the pickup for the pump, at one end of the tank and running delivery tubes to the other end of the conditioner.

With a two-chamber conditioner, the water passes lengthwise through the filter chamber, then downwards into a lower chamber containing the temperature control element where it would return lengthwise through that chamber to the inlet end and return to the aquarium through the spillway. To shorten the delivery tubes and eliminate the fluid friction in the tubes, a third pass could be added to the conditioner and the inlet would then be located at one end of the conditioner and the outlet at the other end. For this purpose, the present invention is provided with three chambers.

In the preferred embodiment of the invention, the conditioner comprises a rectangular first chamber 17 having inlet tubes 19 projecting through one end wall 21 thereof. An automatic temperature control element 23 is disposed in the lower portion 25 of the chamber. This element can either be one or more heating elements, or a refrigeration element, depending upon whether the water temperature must be raised or lowered with respect to the ambient air temperature.

Heating elements are usually encased in glass tubes and are of the standard type readily available from most aquarium supply houses. They include a rheostat for setting the temperature and an automitic control switch for maintaining the desired temperature automatically.

The refrigerating element 23, as utilized in the illustrated embodiment of the present invention, is simply a copper tube arranged in a winding side by side pattern and secured to a thin copper plate. The coils and the plate have been coated with styrene to prevent metal contact with the water. The refrigeration tubes can be led up and out of the box at one end or they can be fed through an end wall of the chamber providing they are suitably sealed in their passage therethrough. In a preferred but structurally more fragile embodiment, the refrigerating tubes are made of glass arranged in coils, or a side by side winding configuration, and securely mounted within the box.

A spillway 27 is disposed at the opposite end of the chamber from the inlet tubes. The inlet for the spillway is spaced from the floor of the chamber at a level above the temperature control elements so that they are continuously covered by water.

In FIGURE 2 of the drawings, the spillway is illustrated as a centrally disposed well into which the water spills. This arrangement is suitable when the conditioner can be located directly over the aquarium. When the conditioner is offset from the aquarium as shown in FIGURE 1, and rests primarily on the refrigeration unit 28, a side box spillway 29 is utilized as shown in cross section by FIGURE 3.

As the water drops through the spillway into the tank, sufficient air is entrapped or carried with the falling water into the aquarium where it is dissolved in the water and provides oxygen for the specimens.

A smaller rectangular second chamber 31 is disposed in the upper portion of the larger chamber 17 and has inlet ports 33 provided with seals 35 on one end thereof for mating with the inlet tubes of the first chamber. Communication ports 37 are formed at the same end of the smaller chamber as the inlet ports and communicate with the lower portion of the larger chamber. Ported baffle means 39 are disposed in the smaller chamber to retain filter materials which are disposed between the baffles. This filter package or cartridge, which is conventional and well known, can be dropped into the larger chamber and rests upon ledges 41 secured to the side walls of the larger chamber. The filter cartridge or package is easily removable from the larger chamber for exchanging the filter material or for taking it out for cleaning.

The filter package or upper chamber is provided with an independent open ended box structure 43 which seals off the upper portion of the smaller chamber to form yet another or third chamber. This box structure can be formed in numerous ways. One is illustrated by FIGURE 2 and includes plates 45 slidable in grooves in the side walls of the upper chamber spaced sufficiently far apart to bracket the inlet ports 33 at the one end of the filter chamber. Alternatively, the third chamber could be a removable box, like the cartridge, with an open end which brackets the inlet ports. In the preferred embodiment, the lower floor of the third chamber is perforated with communication ports 47 at the end removed from the inlet ports. However, these ports could be formed in the end walls or elsewhere.

The whole conditioner is made from clear acrylic plastic to avoid the problem of corrosion or electrolysis. A cover 49 is provided to help insulate the tank and eliminate escaping odors. The conditioner has dimensions on the order of twenty inches long, seven inches wide, and six inches high. This is large enough to incorporate all of the desired features and is usually small enough to be placed on the top of the tank and not be unduly noticeable. If the tank is sufficiently large, two of these units can be placed end to end with the inlet tubes disposed at the opposite ends whereby the filter cycle would run the water from the ends of the aquarium to both spillways disposed in the middle of the aquarium. Thus, the circulation would be from the middle to the ends going in both directions.

The circulating pump 15 provided for the invention is of a new and novel design which can be completely constructed of clear acrylic plastic. The intake for the pump is located in the lower horizontal surface 51 and comprises numerous small holes or slits. The intake water rises in the body of the pump through a baffle 53 which keeps the turbulence confined to the pumping chamber located above the baffle. A paddle wheel impeller blade 55 is secured to the end of an impeller shaft 57 and is concentrically disposed in the pumping chamber. The shaft of the impeller extends upward through a central support tube 59 which is sealed from the pumping chamber by an O-ring bushing 61. Manifold tubes 63 deliver the pressurized water from the pumping chamber which houses the impeller 55 to a collecting chamber 65 disposed above the level of the water. Clear vinyl delivery tubes 67 attach to output tubes 69 arranged in one wall of the collecting chamber 65 and deliver the pressurized water to the conditioner. An electric drive motor M of approximately 1/40 HP is secured to a mounting plate 71 disposed above the collecting chamber and is engaged with the impeller shaft by a spring S which releases and permits the motor to run free if the impeller shaft seizes or is jammed.

The water is taken in by the pump and fed through the inlet tubes of the conditioner into the upper chamber where it traverses to the other end of the chamber and drops through the ports into the filter chamber. The water is semi-pressurized by virtue of the closed construction of the filter cartridge. It is then forced through conventional filters and baffles to the other end of the chamber adjacent the inlet ports. It then drops through the communication ports into the lower chamber where the automatic temperature control elements are located. The water is then heated or cooled to the proper temperature as it passes to the opposite end of the chamber. The reconditioned water then falls through the intake of the spillway and back into the aquarium.

The invention is a very versatile device and it is possible to utilize only the filter cartridge of the invention when it is only necessary to cleanse the water, or the whole unit can be utilized with the temperature control elements deactivated or simply left out of the larger chamber.

The conditioner has the unique characteristic of being self-contained. The larger chamber holds all of the smaller chambers. If the filters fill up or any of the communication ports plug, the semi-pressurized water simply bypasses into the larger lower chamber and is returned to the aquarium. It cannot spill onto the floor.

The circulating pump of the present invention is capable of producing an unusually large volumetric flow of approximately 275 gallons per hour at a relatively low pressure which is ideal for the present use. When the pump is delivering water to the conditioner, the filtering unit reduces the flow to approximately 240 gallons per hour. This cleansing rate is sufficient for adequate maintenance of aquariums having large capacities and will recycle the water of a 25 gallon approximately ten times per hour. Two or more units can be utilized for much larger aquariums.

It will be apparent from the foregoing description of the invention, in its preferred form, that it will fulfill all of the objects attributable thereto. While it has been illustrated and described in considerable detail, the invention is not to be limited to such details as have been set forth.

I claim:

1. An aquarium conditioner comprising:
   at least two elongated chambers,
   inlet means at one end of the second of said chambers,
   outlet means at the other end of said second chamber from said inlet means communicating with the first of said chambers,
   a spillway intake disposed at the other end of said first chamber from the outlet means of said second chamber for communicating with an aquarium,
   filter means disposed in one of said chambers, and
   automatic temperature control elements disposed in the other of said chambers.

2. The aquarium conditioner of claim 1 wherein a high volume flow is provided by pump means for semi-pressurizing the conditioner with the water to be treated.

3. The aquarium conditioner of claim 1 wherein said chambers are disposed longitudinally adjacent each other.

4. The aquarium conditioner of claim 3 wherein one chamber is disposed over the other.

5. The aquarium conditioner of claim 1 wherein non-corrodible materials are utilized for all of the parts thereof.

6. The aquarium conditioner of claim 1 wherein said first and second chambers are elongated boxes and said second chamber is disposed within the upper portion of the box forming said second chamber.

7. The aquarium conditioner of claim 1 including a third chamber disposed within the upper portion of the second chamber and communicating with the inlet means thereof and having outlet ports at the opposite end of said third chamber from said inlet means.

8. The aquarium conditioner of claim 1 wherein the temperature control element disposed in one of said chambers is a refrigeration element.

9. The aquarium conditioner of claim 1 wherein the temperature control element disposed in one of said chambers is a heating element.

10. An aquarium conditioner for mounting above an aquarium tank comprising:
    at least three elongated longitudinally adjacent chambers,
    the third of said chambers having inlet means at one end thereof and ports at the other end thereof communicating with one end of the second of said chambers,
    the second of said chambers having ports communicating with the first of said chambers disposed at the opposite end of said second chamber from the end communicating with the third of said chambers,
    the first of said chambers having a spillway disposed opposite the end of said chamber communicating with said second chamber for communicating with an aquarium,
    filter means disposed in one of said chambers, and
    a temperature control element disposed in one of the other of said chambers, all of the elements of said aquarium conditioner being non-corrodible.

11. An aquarium conditioner for mounting above an aquarium tank comprising:
    a first rectangular chamber having inlet tubes projecting through one end wall thereof, a temperature control element disposed in the lower portion of said chamber, and a spillway disposed at the opposite end of said chamber from said inlet tubes and having an inlet disposed in said chamber at a level above said temperature control element,
    a second and smaller rectangular chamber disposed in the upper portion of the first chamber and having inlet ports in one end wall thereof for mating with the inlet tubes of said first chamber, communication ports at the same end of said second chamber as said inlet ports communicating with the first chamber, ported baffle means disposed in said second chamber, and filter material disposed between said baffles,
    a third chamber disposed in the upper portion of said second chamber and having an open end bracketing said inlet ports and sealing with the end wall of said second chamber containing said inlet means, and
    communication ports disposed at the end of said third chamber opposite said open end and communicating with the second chamber, all of said aquarium conditioner being constructed of materials inert with respect to aquarium fluids.

12. The aquarium conditioner of claim 10 wherein the chambers are disposed one on top of the other.

13. The aquarium conditioner of claim 10 wherein the first of said chambers is a box containing the other two of said chambers in the upper portion thereof.

14. The aquarium conditioner of claim 13 wherein the second of said chambers is also a box containing the first of said chambers in the upper portion thereof.

15. The aquarium conditioner of claim 14 wherein said third chamber is formed by upper and lower panels sealing with the sides of the box forming the second of said chambers.

16. The aquarium conditioner of claim 10 wherein the said third chamber is an open ended box which is disposed within the second of said chambers.

17. The aquarium conditioner of claim 10 wherein the chamber in which said filter means is disposed includes ported baffles for retaining the filter means.

18. The aquarium conditioner of claim 11 wherein the temperature control elements are disposed in the first of said chambers and said spillway has an intake disposed in said chamber spaced from the lower surface thereof at a level above the temperature control elements.

References Cited

UNITED STATES PATENTS

| | | | |
|---|---|---|---|
| 597,249 | 1/1898 | Smith | 119—5 |
| 1,182,465 | 5/1916 | Evans | 210—286 X |
| 1,769,388 | 7/1930 | Prentice | 210—283 X |
| 2,652,151 | 9/1953 | Legus | 210—124 |
| 2,696,800 | 12/1954 | Rork | 210—169 X |
| 2,742,381 | 4/1956 | Weiss et al. | 210—284 X |
| 3,324,829 | 6/1967 | De José et al. | 119—5 |

ALDRICH F. MEDBERY, Primary Examiner

U.S. Cl. X.R.

210—169, 283